(12) United States Patent
Liu (10) Patent No.: US 12,126,542 B2
(45) Date of Patent: Oct. 22, 2024

(54) FORWARDING INFORMATION OBTAINING METHOD AND APPARATUS

(71) Applicant: Huawei Technologies Co., Ltd., Shenzhen (CN)

(72) Inventor: Min Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/813,083

(22) Filed: Jul. 18, 2022

(65) Prior Publication Data

US 2022/0353198 A1 Nov. 3, 2022

Related U.S. Application Data (63) Continuation of application No. PCT/CN2020/118600, filed on Sep. 29, 2020.

(30) Foreign Application Priority Data

Jan. 19, 2020 (CN) .......................... 202010059919.3

(51) Int. Cl.
| | | |
|---|---|---|
| G06F 15/173 | (2006.01) | |
| H04L 45/745 | (2022.01) | |
| H04L 47/122 | (2022.01) | |
| H04L 47/62 | (2022.01) | |
| H04L 49/90 | (2022.01) | |

(52) U.S. Cl.
CPC ........ *H04L 47/6215* (2013.01); *H04L 45/745* (2013.01); *H04L 47/122* (2013.01); *H04L 49/9036* (2013.01)

(58) Field of Classification Search
CPC .............. H04L 47/6215; H04L 45/745; H04L 45/7452; H04L 45/7459; H04L 47/122; H04L 49/9036
USPC ......................................... 709/224, 223, 226
See application file for complete search history.

(56) References Cited

U.S. PATENT DOCUMENTS

| | | | |
|---|---|---|---|
| 7,720,951 B2 * | 5/2010 | Brown ................... | H04L 47/26 370/235 |
| 11,032,205 B2 | 6/2021 | Shen et al. | |
| 2002/0118641 A1 * | 8/2002 | Kobayashi .............. | H04L 45/02 370/230 |

(Continued)

FOREIGN PATENT DOCUMENTS

| | | |
|---|---|---|
| CN | 101854307 A | 10/2010 |
| CN | 103907323 A | 7/2014 |

(Continued)

OTHER PUBLICATIONS

Hyun, J. et al., "Towards Knowledge-Defined Networking using In-band Network Telemetry," IEEE/IFIP Network Operations and Management Symposium, Apr. 23, 2018, 7 pages.

*Primary Examiner* — Kaylee J Huang
(74) *Attorney, Agent, or Firm* — Slater Matsil, LLP (57) ABSTRACT

A forwarding information obtaining device and method, the method including obtaining, by a first device in response to congestion in a first queue, a service parameter identifier of a first packet buffered in the first queue, where the service parameter identifier indicates a parameter used to forward the first packet, and performing, by the first device, a first operation based on the service parameter identifier, where the first operation is performed to relieve the congestion of the first queue.

17 Claims, 3 Drawing Sheets

(56) References Cited

U.S. PATENT DOCUMENTS

| | | | |
|---|---|---|---|
| 2005/0198276 A1* | 9/2005 | Shiga | H04L 47/263 709/224 |
| 2006/0039301 A1* | 2/2006 | Tsuji | H04L 12/42 370/258 |
| 2008/0198864 A1* | 8/2008 | Takase | H04L 12/66 370/401 |
| 2009/0296725 A1* | 12/2009 | Imanaka | H04L 45/12 370/401 |
| 2010/0182920 A1* | 7/2010 | Matsuoka | H04L 45/28 370/473 |
| 2011/0273995 A1* | 11/2011 | Ahn | H04L 43/091 370/241 |
| 2014/0192646 A1 | 7/2014 | Mir et al. | |
| 2014/0254356 A1 | 9/2014 | Jeong et al. | |
| 2015/0124611 A1 | 5/2015 | Attar et al. | |
| 2018/0376488 A1* | 12/2018 | Han | H04W 72/569 |

FOREIGN PATENT DOCUMENTS

| | | |
|---|---|---|
| CN | 105589506 A | 5/2016 |
| CN | 105812285 A | 7/2016 |
| CN | 108243116 A | 7/2018 |
| CN | 108667739 A | 10/2018 |
| CN | 110099000 A | 8/2019 |

* cited by examiner

FORWARDING INFORMATION OBTAINING METHOD AND APPARATUS

CROSS-REFERENCE TO RELATED APPLICATIONS

This application is a continuation of International Application No. PCT/CN2020/118600, filed on Sep. 29, 2020, which claims priority to Chinese Patent Application 202010059919.3, filed on Jan. 19, 2020. The disclosures of the aforementioned applications are hereby incorporated by reference in their entireties.

TECHNICAL FIELD

This application relates to the field of device management, and in particular, to a forwarding information obtaining method and apparatus.

BACKGROUND

A network device may be configured to forward a packet. In a process in which the network device forwards a packet, a microburst may occur. The microburst is a phenomenon in which a relatively large amount of burst data is received within a relatively short period of time and consequently approaches or even exceeds a port bandwidth and a buffer capability within the relatively short period of time. The microburst exerts specific effect on a forwarded packet. For example, a delay increases or a packet loss occurs during packet forwarding. When the microburst occurs, a service flow affected by the microburst needs to be determined. Currently, the network device cannot determine a service flow corresponding to a packet involved in the microburst.

SUMMARY

Embodiments of this application provide a forwarding information obtaining method, to determine a service flow involved in a microburst.

According to a first aspect, an embodiment of this application provides a forwarding information obtaining method, and the method may be performed by a first device. The first device obtains, when a first queue is congested, a service parameter identifier of a first packet buffered in the first queue. The first queue is an egress queue in the first device. The service parameter identifier of the first packet is used to indicate a parameter used to forward the first packet. The parameter used to forward the first packet may be used to indicate a service flow to which the first packet belongs. When the first queue is congested, by using the service parameter identifier of the first packet, the first device may determine the service flow to which the first packet belongs, in other words, determine a service flow affected by the congestion of the first queue. The first device performs a first operation based on the service parameter identifier of the first packet. The first operation is used to relieve the congestion of the first queue. In the method, when the first queue is congested, the first device can quickly and accurately determine a service affected by the congestion of the first queue. This helps relieve effect exerted by the congestion of the first queue on the service flow to which the first packet belongs.

In a possible implementation, that the first device performs the first operation may be, for example, the first device sends the service parameter identifier of the first packet to a second device. The second device may be a controller, or may be a network management device. After the first device sends the service parameter identifier of the first packet to the second device, the second device analyzes the service parameter identifier of the first packet, and performs corresponding processing, to relieve effect exerted by the congestion of the first queue on the service flow to which the first packet belongs.

In a possible implementation, the first device may further send information about the first queue to the second device, so that the second device determines more information about the congested first queue, and the second device monitors a running status of the first device more comprehensively. The information about the first queue herein may include, for example, one or more of an identifier of the first queue, a priority of the first queue, and a buffer length of the first queue.

In a possible implementation, the first device may perform, based on an indication of the second device, steps of obtaining the service parameter identifier of the first packet when the first queue is congested and sending the service parameter identifier of the first packet to the second device. Specifically, the second device may generate a first message, and send the first message to the first device. The first message is used to indicate the first device to send, to the second device when congestion occurs, a service parameter identifier carried in a packet in a congested queue.

In a possible implementation, when the second device is a network management device, the first message may be a message expressed in a YANG data model. In some embodiments, the first message may include a correspondence, and the correspondence includes the service parameter identifier of the first packet and the parameter used to forward the first packet. After receiving the first message, the first device may store the correspondence. After obtaining the parameter used to forward the first packet, the first device may determine the service parameter identifier of the first packet based on the correspondence.

In a possible implementation, that the first device performs the first operation may be, for example, the first device adjusts a priority of the service flow to which the first packet belongs. Specifically, the first device may store the correspondence between the service parameter identifier of the first packet and the parameter used to forward the first packet, the first device may determine, based on the correspondence, the parameter used to forward the first packet, and after determining the parameter used to forward the first packet, the first device determines the service flow to which the first packet belongs. Then, the first device may obtain a first policy. The first policy is used to increase the priority of the service flow corresponding to the service parameter identifier. In other words, the first policy is used to adjust the priority of the service flow to which the first packet belongs. In this way, for a second packet that belongs to a same service flow as the first packet and that is sent after the first packet, if the first device obtains the second packet, the first device may forward the second packet according to the first policy. Because the priority of the service flow to which the first packet belongs is increased, a priority of the second packet determined according to the first policy is higher than that of the first packet. Therefore, the first device may forward the second packet by using a second queue whose priority is higher than that of the first queue. This prevents forwarding of the second packet from being affected by the congestion of the first queue in the first device.

In a possible implementation, that the first device performs the first operation may be, for example, the first device changes a port used to forward the service flow to which the first packet belongs. The first device may store a forwarding entry that is used to indicate the first device to forward a packet. The first device may determine a packet forwarding port based on the forwarding entry. After determining the packet forwarding port, the first device may buffer, based on a priority of a packet, the packet in an egress queue corresponding to the port. If the first queue is congested, for the service flow to which the first packet belongs, the first device may change the port used to forward the service flow to which the first packet belongs. This prevents the second packet sent after the first packet from continuing to be forwarded by using the first queue. The second packet and the first packet belong to a same service flow. Specifically, the first device may generate a first forwarding entry based on the service parameter identifier. Specifically, the first device may determine, based on the foregoing correspondence, the parameter used to forward the first packet, and then generate the first forwarding entry including a correspondence between the parameter used to forward the first packet and a port. The port corresponding to the parameter used to forward the first packet is different from a port through which the first device forwards the first packet. In a subsequent packet forwarding process, the first device may forward a packet based on the first forwarding entry. For the second packet that belongs to a same service flow as the first packet and that is sent after the first packet, the first device may forward the second packet based on the first forwarding entry. Because a parameter used to forward the second packet is the same as the parameter used to forward the first packet, the port that is determined based on the first forwarding entry and that is used to forward the second packet is different from the port used to forward the first packet. Therefore, the second packet may be not forwarded by using the first queue. This prevents forwarding of the second packet from being affected by the congestion of the first queue in the first device.

In a possible implementation, a difference from the conventional technology is that the first queue further buffers the service parameter identifier of the first packet in addition to the first packet. The service parameter identifier of the first packet is in a packet header of a third packet, and the third packet includes the first packet and the packet header. Therefore, when the first device determines that the first queue is congested, the first device may read the service parameter identifier of the first packet from the packet header of the third packet buffered in the first queue.

In a possible implementation, the service parameter identifier in a packet header of the first packet is added by the first device. Specifically, the first device obtains a second forwarding entry. The second forwarding entry includes the parameter used to forward the first packet. The second forwarding entry is a forwarding entry used to forward the first packet. The first device may parse the first packet, and determine, based on a parsing result and the second forwarding entry, the parameter used to forward the first packet. Then, the first device obtains the service parameter identifier of the first packet based on the correspondence and the parameter used to forward the first packet. The correspondence includes the service parameter identifier of the first packet and the parameter used to forward the first packet. After obtaining the service parameter identifier of the first packet, the first device may add the service parameter identifier to the packet header, and obtain the third packet based on the packet header and the first packet. The third packet includes the first packet and the packet header.

In a possible implementation, for one service flow, address prefixes that match destination internet protocol (IP) addresses of all packets belonging to the service flow are the same. Therefore, an address prefix that matches a destination IP address of the first packet may be used to indicate the service flow to which the first packet belongs. In this case, the parameter used to forward the first packet may include the address prefix that matches the destination IP address of the first packet. In some embodiments, a packet may be forwarded through a tunnel in a forwarding process. For one service flow, all packets in the service flow are forwarded through a same tunnel. The parameter used to forward the first packet may include a tunnel for forwarding the first packet. In some embodiments, all packets in one service flow have same multi-tuple information, and the parameter used to forward the first packet may include multi-tuple information of the first packet. The multi-tuple information herein may be 2-tuple information, 5-tuple information, or the like. Examples of possible forms of the multi-tuple information are not listed one by one in this application.

According to a second aspect, an embodiment of this application provides a forwarding information obtaining method. The method includes a second device generates a first message. The first message is used to indicate a first device to send, to the second device when congestion occurs, a service parameter identifier carried in a packet in a congested queue. The second device sends the first message to the first device.

In a possible implementation, the first message further includes a correspondence, and the correspondence includes a service parameter identifier and a parameter used to forward a first packet.

In a possible implementation, the method further includes the second device receives the service parameter identifier sent by the first device. The service parameter identifier is used to indicate the parameter used to forward the first packet.

In a possible implementation, after receiving the service parameter identifier of the first packet, the second device may determine, based on the correspondence, the parameter used to forward the first packet, and after determining the parameter used to forward the first packet, the second device determines a service flow to which the first packet belongs. Because a first queue in the first device is congested, for a second packet in the service flow to which the first packet belongs, if the second packet is still forwarded in a forwarding manner used to forward the first packet, the second packet is still forwarded by using the first queue in the first device. This may aggravate the congestion of the first queue, and lengthen a transmission delay of the service flow to which the first packet belongs or aggravate a packet loss. The second packet is a packet sent after the first packet. To resolve this problem, after determining, based on the service parameter identifier of the first packet, the service flow to which the first packet belongs, the second device may perform a path redirection operation on the second packet, in other words, change a forwarding path of the second packet. For example, the path that is obtained by performing the path redirection operation by the second device and that is used to forward the second packet does not include the first device. In other words, the second packet forwarded after the first packet in the service flow to which the first packet belongs is not forwarded by the first device, but is forwarded through another path. This prevents forwarding of the second packet from being affected by the congestion of the first queue in the first device.

According to a third aspect, an embodiment of this application provides a forwarding information obtaining apparatus. The apparatus includes an obtaining unit and a processing unit. The obtaining unit is configured to obtain, when a first queue is congested, a service parameter identifier of a first packet buffered in the first queue. The service parameter identifier is used to indicate a parameter used to forward the first packet. The processing unit is configured to perform a first operation based on the service parameter identifier. The first operation is used to relieve the congestion of the first queue.

In a possible implementation, the processing unit is specifically configured to send the service parameter identifier to a second device.

In a possible implementation, the processing unit is further configured to send information about the first queue to the second device. The information about the first queue includes any one or more of an identifier of the first queue, a priority of the first queue, and a buffer length of the first queue.

In a possible implementation, the apparatus further includes a receiving unit. The receiving unit is configured to receive a first message from the second device. The first message is used to indicate to send, to the second device when congestion occurs, a service parameter identifier carried in a packet in a congested queue.

In a possible implementation, the first message further includes a correspondence, and the correspondence includes the service parameter identifier and the parameter used to forward the first packet.

In a possible implementation, the processing unit is specifically configured to obtain a first policy based on the service parameter identifier, where the first policy is used to increase a priority of a service flow corresponding to the service parameter identifier, and send a second packet according to the first policy by using a second queue, where the second packet is a packet sent after the first packet in the service flow to which the first packet belongs.

In a possible implementation, the processing unit is specifically configured to obtain a first forwarding entry based on the service parameter identifier, where the first forwarding entry includes a correspondence between the parameter used to forward the first packet and a port, the port is used to send a second packet, the second packet is a packet sent after the first packet in a service flow to which the first packet belongs, and the port is different from a port used to send the first packet, and send the second packet based on the first forwarding entry.

In a possible implementation, the obtaining unit is specifically configured to obtain the service parameter identifier from a packet header of a third packet. The packet header of the third packet includes the service parameter identifier, and the third packet includes the first packet and the packet header.

In a possible implementation, the obtaining unit is further configured to obtain a second forwarding entry, where the second forwarding entry includes the parameter used to forward the first packet, obtain the service parameter identifier based on the correspondence and the parameter used to forward the first packet, where the correspondence includes the service parameter identifier and the parameter used to forward the first packet, and obtain the third packet based on the first packet and the service parameter identifier of the first packet, where the packet header of the third packet includes the service parameter identifier of the first packet.

In a possible implementation, the parameter used to forward the first packet includes one or more of an address prefix, a tunnel, and multi-tuple information that match a destination internet protocol IP address.

According to a fourth aspect, an embodiment of this application provides a forwarding information obtaining apparatus that is applied to a second device. The apparatus includes a generation unit and a sending unit. The generation unit is configured to generate a first message. The first message is used to indicate a first device to send, to the second device when congestion occurs, a service parameter identifier carried in a packet in a congested queue. The sending unit is configured to send the first message to the first device.

In a possible implementation, the first message further includes a correspondence, and the correspondence includes a service parameter identifier and a parameter used to forward a first packet.

In a possible implementation, the apparatus further includes a receiving unit. The receiving unit is configured to receive the service parameter identifier sent by the first device. The service parameter identifier is used to indicate the parameter used to forward the first packet.

In a possible implementation, the apparatus further includes an obtaining unit. The obtaining unit is configured to obtain, based on the service parameter identifier, a path used to forward a second packet. The path used to forward the second packet does not include the first device, and the second packet is a packet sent after the first packet in a service flow to which the first packet belongs.

According to a fifth aspect, an embodiment of this application provides a forwarding information obtaining device. The device includes a processor and a memory. The memory is configured to store instructions, and the processor is configured to execute the instructions in the memory, to perform the method according to the first aspect or the method according to the second aspect.

According to a sixth aspect, an embodiment of this application further provides a computer-readable storage medium including instructions. When the computer-readable storage medium is run on a computer, the computer is enabled to perform the method according to the first aspect or the method according to the second aspect.

According to a seventh aspect, an embodiment of this application provides a computer program product including instructions. When the computer program product is run on a computer, the computer is enabled to perform the method according to the first aspect or the method according to the second aspect.

BRIEF DESCRIPTION OF THE DRAWINGS

To describe the technical solutions in embodiments of this application or in the conventional technology more clearly, the following briefly describes the accompanying drawings required in embodiments or the conventional technology. It is clear that the accompanying drawings in the following descriptions show some embodiments of this application, and persons of ordinary skill in the art may still derive other drawings from these accompanying drawings without creative efforts.

DETAILED DESCRIPTION OF ILLUSTRATIVE EMBODIMENTS

For ease of understanding, a mechanism for forwarding a packet by a network device is first briefly described.

Figure 1:
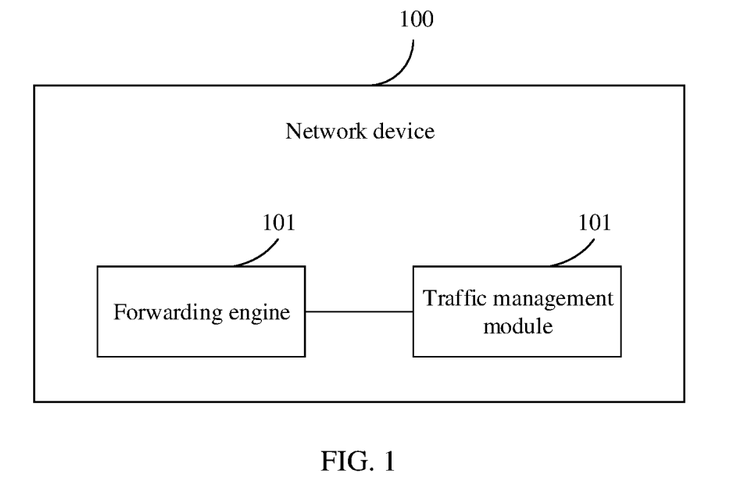
FIG. 1 is a schematic diagram of a structure of a network device.

FIG. 1 is a schematic diagram of a structure of a network device. As shown in FIG. 1, the network device 100 may include a forwarding engine (FE) 101 and a traffic management (TM) module 102. The FE 101 and the TM module 102 may be integrated into one chip, or may be located on two different chips. This is not specifically limited in embodiments of this application. The FE 101 may be configured to obtain a packet from another network device, and parse the packet, to obtain, based on a locally stored forwarding entry, information such as an outbound interface for forwarding the packet and a next hop. Specifically, the FE 101 may identify a service flow to which the packet belongs. The TM module 102 is configured to implement queue scheduling. For example, one interface corresponds to a plurality of egress queues. The TM module 102 determines a dequeue rule of a packet in each egress queue by using a scheduling algorithm. The TM module 102 may determine whether the egress queue is congested, but the TM module 102 cannot determine a service flow to which a packet in the egress queue belongs. If the egress queue is congested because of a microburst, the TM module 102 may determine that the egress queue is congested, but cannot determine a service flow to which a packet buffered in the congested egress queue belongs. Consequently, the service flow is affected in a forwarding process. For example, a transmission delay is lengthened, and a packet loss occurs.

To resolve the problem, an embodiment of this application provides a forwarding information obtaining method. When a first queue in a first device is congested, by using a service parameter identifier of a first packet, the first device may determine a service flow to which the first packet belongs, in other words, determine a service flow affected by a microburst. The first device may perform a first operation based on the service parameter identifier of the first packet. The first operation is used to relieve the congestion of the first queue, to reduce effect exerted by the congestion of the first queue on the service flow to which the first packet belongs. The first packet is a packet buffered in the first queue.

Figure 2:
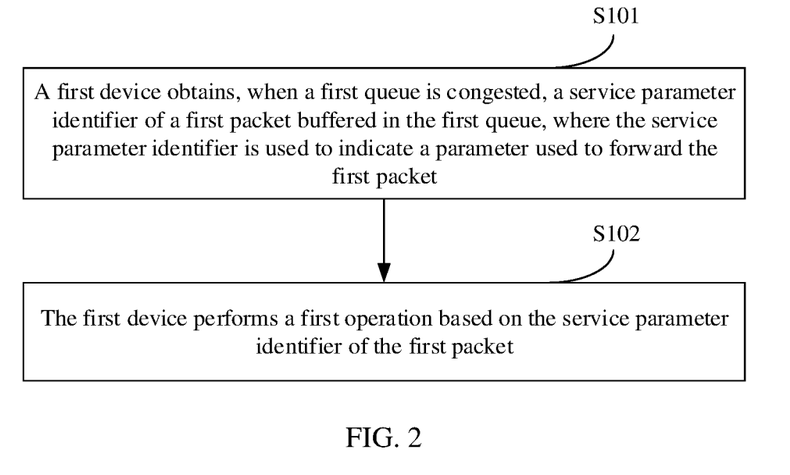
FIG. 2 is a schematic flowchart of a forwarding information obtaining method according to an embodiment of this application.

With reference to the accompanying drawings, the following describes the forwarding information obtaining method according to the embodiment of this application. FIG. 2 is a schematic flowchart of a forwarding information obtaining method according to an embodiment of this application. The forwarding information obtaining method shown in FIG. 2 may be implemented, for example, by performing S101 and S102.

S101: A first device obtains, when a first queue is congested, a service parameter identifier of a first packet buffered in the first queue, where the service parameter identifier is used to indicate a parameter used to forward the first packet.

The first device in this embodiment of this application may be a network device having a packet forwarding function. For example, the first device may be the network device 100 shown in FIG. 1. Specifically, the TM module 102 in the network device 100 may determine whether the first queue in the first device is congested. That the first queue is congested means that a quantity of packets buffered in the first queue is greater than a buffer length of the first queue, or a quantity of packets in the first queue exceeds a preset threshold.

The first queue in this embodiment of this application is an egress queue corresponding to a port of the first device. The first queue may be used to buffer a to-be-forwarded packet. For a port of the first device, if the port may be used to forward a packet to another device, one or more egress queues may be configured in the port. Each egress queue is provided with a priority. When forwarding a packet, the first device may determine, based on a priority of the packet, an egress queue into which the packet enters. A priority of an egress queue matches a priority of a packet buffered in the egress queue. For example, if a priority of a packet is high, a priority of an egress queue into which the packet enters is also high.

When the first device determines that the first queue in the first device is congested, the first device may obtain the service parameter identifier of the first packet buffered in the first queue. The service parameter identifier of the first packet may be carried in a packet header of a third packet sent by the FE 101 to the TM module 102. The third packet includes the packet header and the first packet. The packet header of the third packet includes the service parameter identifier of the first packet. When the first device determines that the first queue is congested, the first device may read the service parameter identifier of the first packet from the packet header of the third packet buffered in the first queue. The service parameter identifier of the first packet is used to indicate the parameter used to forward the first packet. For one service flow, parameters used to forward all packets in the service flow are the same. In other words, the parameter used to forward the first packet may be used to indicate a service flow to which the first packet belongs. In other words, the first device may determine, by using the service parameter identifier of the first packet, the service flow to which the first packet belongs.

The parameter used to forward the first packet is not specifically limited in this embodiment of this application. In some embodiments, for one service flow, address prefixes that match destination IP addresses of all packets belonging to the service flow are the same. Therefore, an address prefix that matches a destination IP address of the first packet may be used to indicate the service flow to which the first packet belongs. In this case, the parameter used to forward the first packet may include the address prefix that matches the destination IP address of the first packet. In some embodiments, a packet may be forwarded through a tunnel in a forwarding process. For one service flow, all packets in the service flow are forwarded through a same tunnel. The tunnel herein may include a multi-protocol label switching (MPLS) tunnel, a segment routing over internet protocol version 6 (SRv6) tunnel, a virtual extensible local area network (VXLAN) tunnel, or the like. The parameter used to forward the first packet may include a tunnel for forwarding the first packet. In some embodiments, all packets in one service flow have same multi-tuple information, and the parameter used to forward the first packet may include multi-tuple information of the first packet. The multi-tuple information herein may be 2-tuple information or 5-tuple information. The 2-tuple includes a source IP address and a destination IP address. The 5-tuple includes a source IP address, a source port number, a destination IP address, a destination port number, and a transport layer protocol number. The multi-tuple information may be used to identify a service flow.

For example, the parameter used to forward the first packet may include one or more of an address prefix, a tunnel, and multi-tuple information that match a destination IP address. The first device may forward the first packet based on a locally stored forwarding entry. The address prefix, the tunnel, and the multi-tuple information all may be parameters included in the forwarding entry. Certainly, the parameter used to forward the first packet may also be another parameter included in the forwarding entry, and examples are not listed one by one herein.

S102: The first device performs a first operation based on the service parameter identifier of the first packet.

In this embodiment of this application, after the first device obtains the service parameter identifier of the first packet, to further relieve effect exerted by the congestion of the first queue on the service flow to which the first packet belongs, the first device may perform the first operation based on the service parameter identifier of the first packet. The first operation is used to relieve the congestion of the first queue. For example, the first operation may be a related operation for relieving effect exerted by the congestion of the first queue on the service flow to which the first packet belongs. The following describes three implementations in which the first device performs the first operation.

Implementation 1: The first device sends the service parameter identifier of the first packet to a second device.

In this embodiment of this application, the second device may be implemented as a controller, a network management device, or an artificial intelligence (AI) device.

In some embodiments, when determining that the first queue is congested, the first device may actively send a service parameter identifier of the first queue to the second device. In some embodiments, when determining that the first queue is congested, the first device may send snapshot information of the first queue to the second device. The snapshot information of the first queue includes the service parameter identifier of the first packet.

After the first device sends the service parameter identifier of the first packet to the second device, the second device analyzes the service parameter identifier of the first packet, and performs corresponding processing, to relieve effect exerted by the congestion of the first queue on the service flow to which the first packet belongs. Specifically, the second device may store a correspondence between the service parameter identifier of the first packet and the parameter used to forward the first packet, after receiving the service parameter identifier of the first packet, the second device may determine, based on the correspondence, the parameter used to forward the first packet, and after determining the parameter used to forward the first packet, the second device determines the service flow to which the first packet belongs. Because a first queue in the first device is congested, for a second packet in the service flow to which the first packet belongs, if the second packet is still forwarded in a forwarding manner used to forward the first packet, the second packet is still forwarded by using the first queue in the first device. This may aggravate the congestion of the first queue, and lengthen a transmission delay of the service flow to which the first packet belongs or aggravate a packet loss. The second packet is a packet sent after the first packet. To resolve this problem, after determining, based on the service parameter identifier of the first packet, the service flow to which the first packet belongs, the second device may perform a path redirection operation on the second packet, in other words, change a forwarding path of the second packet. For example, the path that is obtained by performing the path redirection operation by the second device and that is used to forward the second packet does not include the first device. In other words, the second packet forwarded after the first packet in the service flow to which the first packet belongs is not forwarded by the first device, but is forwarded through another path. This prevents forwarding of the second packet from being affected by the congestion of the first queue in the first device.

In an implementation of this embodiment of this application, the first device may further send information about the first queue to the second device, so that the second device determines more information about the congested first queue, and the second device monitors a running status of the first device more comprehensively. The information about the first queue herein may include, for example, any one or more of an identifier of the first queue, a priority of the first queue, and the buffer length of the first queue.

In some implementations, the first device may perform, based on an indication of the second device, Sim and the step of sending the service parameter identifier of the first packet to the second device. Specifically, the second device may send a first message to the first device. The first message is used to indicate the first device to send, to the second device when congestion occurs, a service parameter identifier carried in a packet in a congested queue. When the second device is a network management device, the first message may be a message expressed in a YANG data model. Content included in the first message is not specifically limited in this embodiment of this application. In some embodiments, the first message may include a correspondence, and the correspondence includes the service parameter identifier of the first packet and the parameter used to forward the first packet. After receiving the first message, the first device may store the correspondence. After obtaining the parameter used to forward the first packet, the first device may determine the service parameter identifier of the first packet based on the correspondence.

Implementation 2: The first device adjusts a priority of the service flow to which the first packet belongs.

In this embodiment of this application, the first device may store the correspondence between the service parameter identifier of the first packet and the parameter used to forward the first packet, the first device may determine, based on the correspondence, the parameter used to forward the first packet, and after determining the parameter used to forward the first packet, the first device determines the service flow to which the first packet belongs. Then, the first device may obtain a first policy. The first policy is used to increase the priority of the service flow corresponding to the service parameter identifier. In other words, the first policy is used to adjust the priority of the service flow to which the first packet belongs. In this way, for a second packet that belongs to a same service flow as the first packet and that is sent after the first packet, if the first device obtains the second packet, the first device may forward the second packet according to the first policy. Because the priority of the service flow to which the first packet belongs is increased, a priority of the second packet determined according to the first policy is higher than that of the first packet. Therefore, the first device may forward the second packet by using a second queue whose priority is higher than that of the first queue. This prevents forwarding of the second packet from being affected by the congestion of the first queue in the first device.

An example in which the parameter used to forward the first packet is multi-tuple information is used currently to describe the foregoing correspondence. Refer to Table 1.

TABLE 1

| Parameter used to forward the first packet | Service parameter identifier |
|---|---|
| First multi-tuple information | 1 |
| Second multi-tuple information | 2 |
| Third multi-tuple information | 3 |
| Fourth multi-tuple information | 4 |

Table 1 is shown only for ease of understanding, and does not constitute any limitation on this embodiment of this application. A value of the service parameter identifier in this embodiment of this application is not limited to the values shown in Table 1.

Implementation 3: The first device changes a port used to forward the service flow to which the first packet belongs.

As described above, the first device may store a forwarding entry that is used to indicate the first device to forward a packet. The first device may determine a packet forwarding port based on the forwarding entry. After determining the packet forwarding port, the first device may buffer, based on a priority of a packet, the packet in an egress queue corresponding to the port. In this embodiment of this application, if the first queue is congested, for the service flow to which the first packet belongs, the first device may change the port used to forward the service flow to which the first packet belongs. This prevents the second packet sent after the first packet from continuing to be forwarded by using the first queue. The second packet and the first packet belong to a same service flow. Specifically, the first device may generate a first forwarding entry based on the service parameter identifier. Specifically, the first device may determine, based on the foregoing correspondence, the parameter used to forward the first packet, and then generate the first forwarding entry including a correspondence between the parameter used to forward the first packet and a port. The port corresponding to the parameter used to forward the first packet is different from a port through which the first device forwards the first packet. In a subsequent packet forwarding process, the first device may forward a packet based on the first forwarding entry. For the second packet that belongs to a same service flow as the first packet and that is sent after the first packet, the first device may send the second packet based on the first forwarding entry. Because a parameter used to forward the second packet is the same as the parameter used to forward the first packet, the port that is determined based on the first forwarding entry and that is used to forward the second packet is different from the port used to forward the first packet. Therefore, the second packet may be not forwarded by using the first queue. This prevents forwarding of the second packet from being affected by the congestion of the first queue in the first device.

It can be learned from the foregoing descriptions that, according to the solution in this embodiment of this application, when the first queue is congested, the service flow affected by the congestion of the first queue may be determined. In addition, the first operation may be performed to relieve effect exerted by the congestion of the first queue on the service flow to which the first packet belongs.

Figure 3:
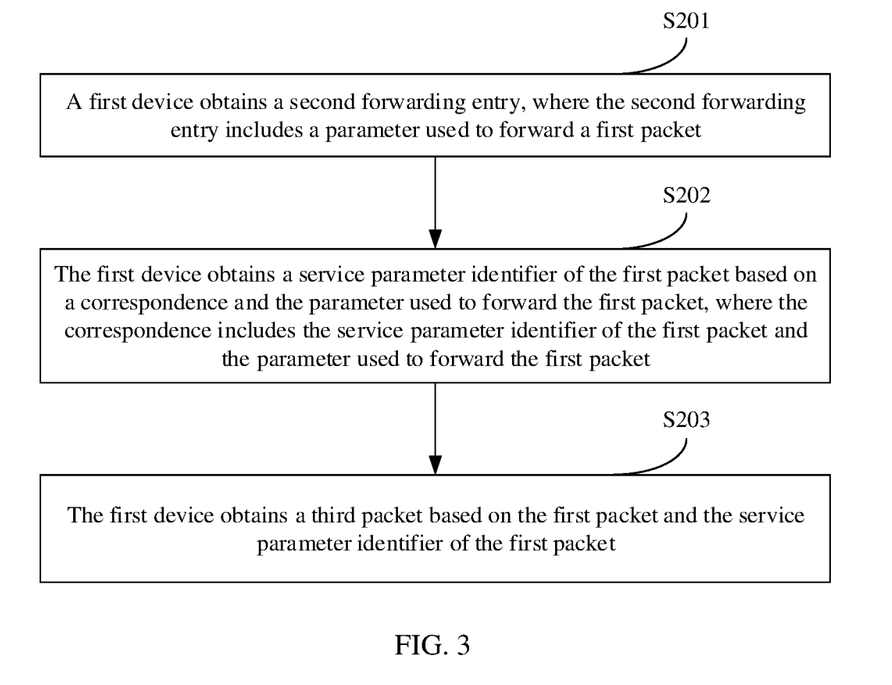
FIG. 3 is a schematic flowchart of a method for obtaining a third packet according to an embodiment of this application.

As described above, in addition to the first packet, the first queue further buffers the service parameter identifier of the first packet. With reference to the accompanying drawings, the following describes a specific implementation in which the first device obtains a third packet including the service parameter identifier of the first packet. FIG. 3 is a schematic flowchart of the method for obtaining the third packet according to an embodiment of this application. The method shown in FIG. 3 may be implemented, for example, by performing S201 to S203.

S201: The first device obtains a second forwarding entry, where the second forwarding entry includes the parameter used to forward the first packet.

In this embodiment of this application, the second forwarding entry is a forwarding entry used to forward the first packet. The first device may parse the first packet, and determine, based on a parsing result and the second forwarding entry, the parameter used to forward the first packet. For example, if the parameter used to forward the first packet is the address prefix that matches the destination IP address, the first device may parse the first packet to obtain the destination IP address of the first packet, and then perform matching between the destination IP address and the second forwarding entry, to obtain the address prefix that matches the destination IP address.

S202: The first device obtains the service parameter identifier of the first packet based on the correspondence and the parameter used to forward the first packet, where the correspondence includes the service parameter identifier of the first packet and the parameter used to forward the first packet.

As described above, the first device stores the correspondence between the service parameter identifier of the first packet and the parameter used to forward the first packet. Therefore, after determining the parameter used to forward the first packet, the first device may determine the service parameter identifier of the first packet based on the correspondence.

S203: The first device obtains the third packet based on the first packet and the service parameter identifier of the first packet.

For example, the first device obtains the third packet based on the first packet and the service parameter identifier of the first packet. The packet header of the third packet includes the service parameter identifier of the first packet.

It should be noted that, in this embodiment of this application, S201 to S203 may be performed by the FE in the first device, and a step of storing the first packet that includes the service parameter identifier may be performed by the TM. Specifically, after S203, the FE may transfer the third packet that includes the service parameter identifier to the TM, and the TM further stores the third packet that includes the service parameter identifier in the first queue.

According to the forwarding information obtaining method in the foregoing embodiment, embodiments of this application further provide corresponding forwarding information obtaining apparatuses. The following describes the apparatuses with reference to the accompanying drawings.

Figure 4:
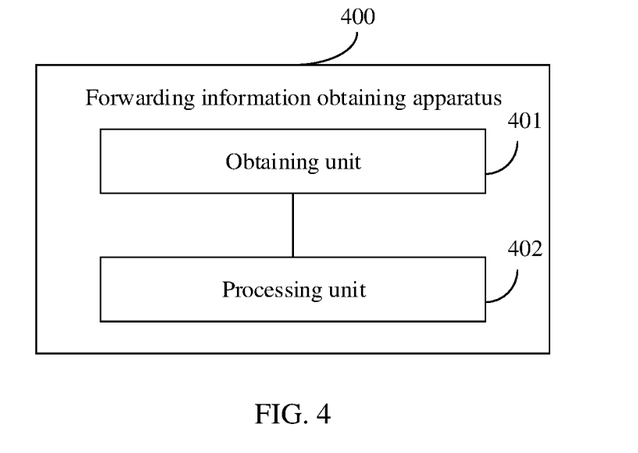
FIG. 4 is a schematic diagram of a structure of a forwarding information obtaining apparatus according to an embodiment of this application.

FIG. 4 is a schematic diagram of a structure of a forwarding information obtaining apparatus according to an embodiment of this application. The forwarding information obtaining apparatus 400 shown in FIG. 4 may be configured to perform the forwarding information obtaining method performed by the first device in the foregoing embodiment.

The forwarding information obtaining apparatus 400 shown in FIG. 4 may include, for example, an obtaining unit 401 and a processing unit 402.

The obtaining unit 401 is configured to obtain, when a first queue is congested, a service parameter identifier of a first packet buffered in the first queue. The service parameter identifier is used to indicate a parameter used to forward the first packet. The processing unit 402 is configured to perform a first operation based on the service parameter identifier. The first operation is used to relieve the congestion of the first queue.

In a possible implementation, the processing unit 402 is specifically configured to send the service parameter identifier to a second device.

In a possible implementation, the processing unit 402 is further configured to send information about the first queue to the second device. The information about the first queue includes any one or more of an identifier of the first queue, a priority of the first queue, and a buffer length of the first queue.

In a possible implementation, the apparatus further includes a receiving unit, configured to receive a first message from the second device. The first message is used to indicate to send, to the second device when congestion occurs, a service parameter identifier carried in a packet in a congested queue.

In a possible implementation, the first message further includes a correspondence, and the correspondence includes the service parameter identifier and the parameter used to forward the first packet.

In a possible implementation, the processing unit 402 is specifically configured to obtain a first policy based on the service parameter identifier, where the first policy is used to increase a priority of a service flow corresponding to the service parameter identifier, and send a second packet according to the first policy by using a second queue, where the second packet is a packet sent after the first packet in the service flow to which the first packet belongs.

In a possible implementation, the processing unit 402 is specifically configured to obtain a first forwarding entry based on the service parameter identifier, where the first forwarding entry includes a correspondence between the parameter used to forward the first packet and a port, the port is used to send a second packet, the second packet is a packet sent after the first packet in a service flow to which the first packet belongs, and the port is different from a port used to send the first packet, and send the second packet based on the first forwarding entry.

In a possible implementation, the obtaining unit 401 is specifically configured to obtain the service parameter identifier from a packet header of a third packet. The packet header of the third packet includes the service parameter identifier, and the third packet includes the first packet and the packet header.

In a possible implementation, the obtaining unit 401 is further configured to obtain a second forwarding entry, where the second forwarding entry includes the parameter used to forward the first packet, obtain the service parameter identifier based on the correspondence and the parameter used to forward the first packet, where the correspondence includes the service parameter identifier and the parameter used to forward the first packet, and obtain the third packet based on the first packet and the service parameter identifier of the first packet, where the packet header of the third packet includes the service parameter identifier of the first packet.

In a possible implementation, the parameter used to forward the first packet includes one or more of an address prefix, a tunnel, and multi-tuple information that match a destination internet protocol IP address.

The apparatus 400 is an apparatus corresponding to the steps performed by the first device provided in the foregoing method embodiment, and specific implementations of the units of the apparatus 400 have a same concept as the steps performed by the first device in the foregoing method embodiment. Therefore, for the specific implementations of the units of the apparatus 400, refer to the descriptions of the steps performed by the first device in the foregoing method embodiment. Details are not described herein again.

Figure 5:
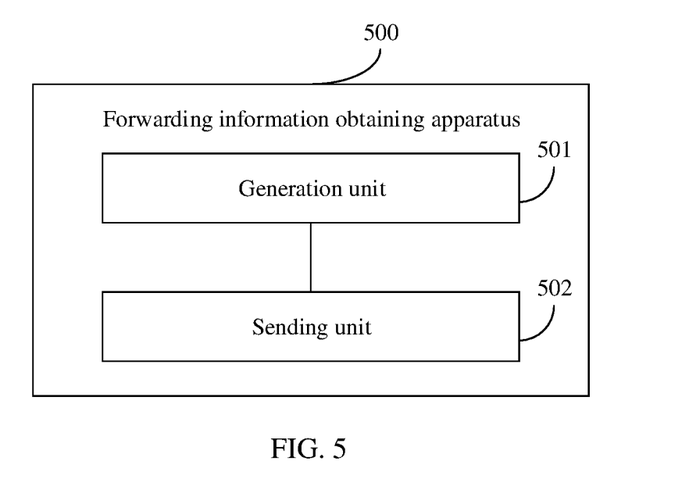
FIG. 5 is a schematic diagram of a structure of a forwarding information obtaining apparatus according to an embodiment of this application.

FIG. 5 is a schematic diagram of a structure of a forwarding information obtaining apparatus according to an embodiment of this application. The forwarding information obtaining apparatus 500 shown in FIG. 5 may be configured to perform the forwarding information obtaining method performed by the second device in the foregoing embodiment.

The forwarding information obtaining apparatus 500 shown in FIG. 5 may include, for example, a generation unit 501 and a sending unit 502.

The generation unit 501 is configured to generate a first message. The first message is used to indicate a first device to send, to the second device when congestion occurs, a service parameter identifier carried in a packet in a congested queue. The sending unit 502 is configured to send the first message to the first device.

In a possible implementation, the first message further includes a correspondence, and the correspondence includes a service parameter identifier and a parameter used to forward a first packet.

In a possible implementation, the apparatus further includes a receiving unit, configured to receive the service parameter identifier sent by the first device. The service parameter identifier is used to indicate the parameter used to forward the first packet.

In a possible implementation, the apparatus further includes an obtaining unit, configured to obtain, based on the service parameter identifier, a path used to forward a second packet. The path used to forward the second packet does not include the first device, and the second packet is a packet sent after the first packet in a service flow to which the first packet belongs.

The apparatus 500 is an apparatus corresponding to the steps performed by the second device provided in the foregoing method embodiment, and specific implementations of the units of the apparatus 500 have a same concept as the steps performed by the second device in the foregoing method embodiment. Therefore, for the specific implementations of the units of the apparatus 500, refer to the descriptions of the steps performed by the second device in the foregoing method embodiment. Details are not described herein again.

An embodiment of this application further provides a forwarding information obtaining device. The device includes a processor and a memory. The memory is configured to store instructions, and the processor is configured to execute the instructions in the memory, to perform the forwarding information obtaining method performed by the first device in the foregoing method embodiment.

An embodiment of this application further provides a forwarding information obtaining device. The device includes a processor and a memory. The memory is configured to store instructions, and the processor is configured to execute the instructions in the memory, to perform the forwarding information method performed by the second device in the foregoing method embodiment.

Figure 6:
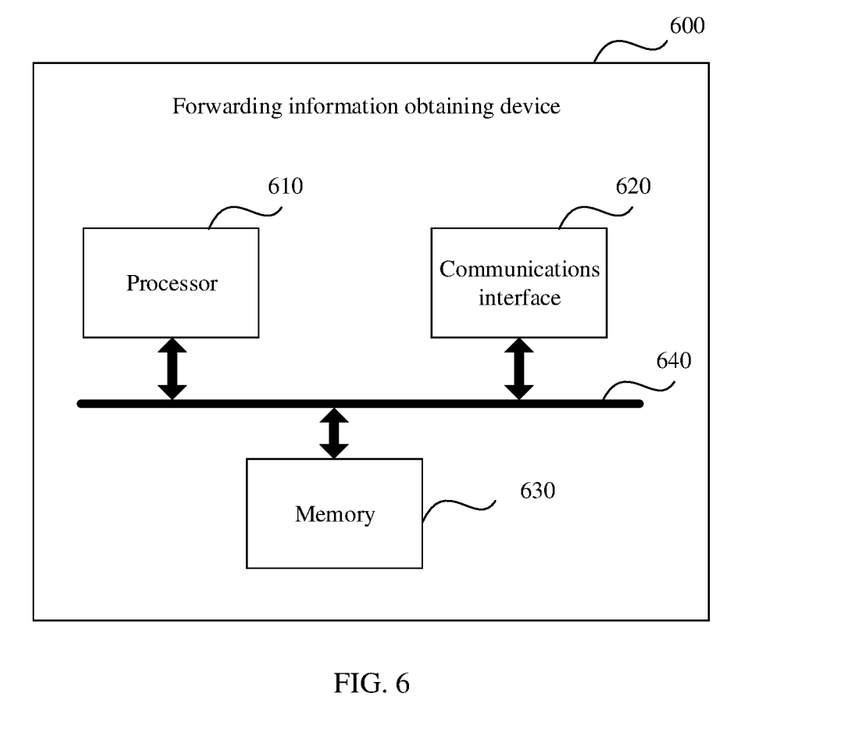
FIG. 6 is a schematic diagram of a structure of a forwarding information obtaining device according to an embodiment of this application.

It should be noted that a hardware structure of the forwarding information obtaining device may be a structure shown in FIG. 6. FIG. 6 is a schematic diagram of a structure of a forwarding information obtaining device according to an embodiment of this application.

As shown in FIG. 6, the forwarding information obtaining device 600 includes a processor 610, a communications interface 620, and a memory 630. There may be one or more processors 610 in the forwarding information obtaining device 600. One processor is used as an example in FIG. 6. In this embodiment of this application, the processor 610, the communications interface 620, and the memory 630 may be connected by using a bus system or in another manner. In FIG. 6, for example, a bus system 640 is used for connection.

The processor 610 may be a central processing unit (CPU), a network processor (NP), or a combination of the CPU and the NP. The processor 610 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 630 may include a volatile memory, such as a random access memory (RAM). The memory 630 may alternatively include a nonvolatile memory, such as a flash memory, a hard disk drive (HDD), or a solid-state drive (SSD). The memory 630 may alternatively include a combination of the foregoing types of memories. The memory 630 may store the correspondence between the service parameter identifier of the first packet and the parameter used to forward the first packet in the foregoing embodiment.

Optionally, the memory 630 stores an operating system, a program, and an executable module or a data structure, or a subset thereof, or an extended set thereof. The program may include various operation instructions for implementing various operations. The operating system may include various system programs for implementing various basic services and processing hardware-based tasks. The processor 610 may read the program in the memory 630, to implement the forwarding information obtaining method performed by the first device in the embodiment of this application, or implement the forwarding information obtaining method performed by the second device in the embodiment of this application.

The bus system 640 may be a peripheral component interconnect (PCI) bus, an extended industry standard architecture (EISA) bus, or the like. The bus system 640 may be classified into an address bus, a data bus, a control bus, and the like. For ease of representation, only one bold line is used for representation in FIG. 6, but this does not mean that there is only one bus or only one type of bus.

An embodiment of this application further provides a computer-readable storage medium, including instructions. When the computer-readable storage medium is run on a computer, the computer is enabled to perform the forwarding information obtaining method performed by the first device in the foregoing embodiment.

An embodiment of this application further provides a computer-readable storage medium, including instructions. When the computer-readable storage medium is run on a computer, the computer is enabled to perform the forwarding information obtaining method performed by the second device in the foregoing embodiment.

An embodiment of this application further provides a computer program product including instructions. When the computer program product is run on a computer, the computer is enabled to perform the forwarding information obtaining method performed by the first device in the foregoing embodiment.

An embodiment of this application further provides a computer program product including instructions. When the computer program product is run on a computer, the computer is enabled to perform the forwarding information obtaining method performed by the second device in the foregoing embodiment.

In this specification, the claims, and the accompanying drawings of this application, terms "first", "second", "third", "fourth", and the like (if existent) are intended to distinguish between similar objects but do not necessarily indicate a specific order or sequence. It should be understood that the terms used in such a way are interchangeable in proper circumstances, so that embodiments described herein can be implemented in other orders than the order illustrated or described herein. Moreover, terms "include", "contain" and any other variants thereof mean to cover the non-exclusive inclusion. For example, a process, a method, a system, a product, or a device that includes a list of steps or units is not necessarily limited to those expressly listed steps or units, but may include other steps or units not expressly listed or inherent to such the process, the method, the product, or the device.

It may be clearly understood by persons skilled in the art that, for the purpose of convenient and brief description, for a detailed working process of the system, the apparatus, and the unit, refer to a corresponding process in the foregoing method embodiment, and details are not described herein again.

In several embodiments provided in this application, it should be understood that the disclosed system, apparatus, and method may be implemented in another manner. For example, the described apparatus embodiment is merely an example. For example, unit division is merely logical service division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of embodiments.

In addition, service units in embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions to enable a computer device (which may be a personal computer, a server, a network device, or the like) to perform all or some of the steps of the method described in embodiments of this application. The storage medium includes any medium that can store program code, such as a USB flash drive, a removable hard disk, a read-only memory (ROM), a random access memory (RAM), a magnetic disk, or a compact disc.

Persons skilled in the art should be aware that, in the foregoing one or more examples, the services described in the present invention may be implemented by hardware, software, firmware, or any combination thereof. When the services are implemented by the software, the services may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or special-purpose computer.

The objectives, technical solutions, and beneficial effects of the present invention are further described in detail in the foregoing specific implementations. It should be understood that the foregoing descriptions are merely specific implementations of the present invention.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof. However, these modifications or replacements do not make the essence of the corresponding technical solutions depart from the scope of the technical solutions of the foregoing embodiments of this application.

What is claimed is:

1. A method, comprising:
receiving, by a first device, a first message from a second device, wherein the first message indicates to the first device to send, to the second device in response to congestion occurring, a corresponding service parameter identifier carried in a packet in a congested queue;
obtaining, by the first device in response to congestion in a first queue, a service parameter identifier of a first packet buffered in the first queue, wherein the service parameter identifier indicates a parameter used to forward the first packet; and
performing, by the first device, a first operation based on the service parameter identifier, wherein the first operation is performed to relieve the congestion of the first queue, and wherein the performing the first operation based on the service parameter identifier comprises:
sending, by the first device, the service parameter identifier to the second device in response to the congestion in the first queue, the second device being different from a sender of the first packet, wherein the parameter indicated by the service parameter identifier indicates a service flow to which the first packet belongs; or
adjusting, by the first device, a priority of the service flow corresponding to the service parameter identifier in response to the congestion in the first queue.

2. The method according to claim 1, further comprising:
sending, by the first device, information about the first queue to the second device, wherein the information about the first queue comprises one or more of an identifier of the first queue, a priority of the first queue, or a buffer length of the first queue.

3. The method according to claim 1, wherein the first message further comprises a correspondence, and wherein the correspondence comprises the service parameter identifier of the first packet and the parameter used to forward the first packet.

4. The method according to claim 1, wherein the performing the first operation based on the service parameter identifier comprises:
obtaining, by the first device, a first policy based on the service parameter identifier, wherein the first policy is associated with increasing the priority of the service flow corresponding to the service parameter identifier; and
sending, by the first device, a second packet according to the first policy using a second queue, wherein the second packet is a packet sent, after the first packet, in the service flow to which the first packet belongs.

5. The method according to claim 1, wherein the performing the first operation based on the service parameter identifier comprises:
obtaining, by the first device, a first forwarding entry based on the service parameter identifier, wherein the first forwarding entry comprises a correspondence between the parameter used to forward the first packet and a second port, wherein the second port is used to send a second packet, wherein the second packet is sent after the first packet in the service flow to which the first packet belongs, and wherein the second port is different from a first port used to send the first packet; and
sending, by the first device, the second packet based on the first forwarding entry.

6. The method according to claim 5, further comprising:
obtaining, by the first device, a second forwarding entry, wherein the second forwarding entry comprises the parameter used to forward the first packet;
obtaining, by the first device, the service parameter identifier based on the correspondence and the parameter used to forward the first packet, wherein the correspondence comprises the service parameter identifier and the parameter used to forward the first packet; and
obtaining, by the first device, a third packet based on the first packet and the service parameter identifier of the first packet, wherein a packet header of the third packet comprises the service parameter identifier of the first packet.

7. The method according to claim 1, wherein the obtaining the service parameter identifier of the first packet comprises:
obtaining, by the first device, the service parameter identifier from a packet header of a third packet, wherein the packet header of the third packet comprises the service parameter identifier, and wherein the third packet comprises the first packet and the packet header.

8. The method according to claim 1, wherein the parameter used to forward the first packet comprises one or more of an address prefix, a tunnel, or multi-tuple information that match a destination internet protocol (IP) address.

9. The method of claim 1, wherein the second device is one of a network controller device or a network management device.

10. An apparatus, comprising:
at least one processor; and
a non-transitory memory coupled to the processor, the non-transitory memory storing a computer program for execution by the at least one processor, the computer program including instructions to perform operations including:
receiving a first message from a second device, wherein the first message indicates to send, to the second device, in response to congestion occurring, a corresponding service parameter identifier carried in a packet in a congested queue;
obtaining, in response to congestion in a first queue, a service parameter identifier of a first packet buffered in the first queue, wherein the service parameter identifier indicates a parameter used to forward the first packet; and
performing a first operation based on the service parameter identifier, wherein the first operation is used to relieve the congestion of the first queue, and wherein the performing the first operation based on the service parameter identifier comprises:
sending the service parameter identifier to the second device in response to the congestion in the first queue, the second device being different from a sender of the first packet, wherein the parameter indicated by the service parameter identifier indicates a service flow to which the first packet belongs; or
adjusting a priority of the service flow corresponding to the service parameter identifier in response to the congestion in the first queue.

11. The apparatus according to claim 10, the operations further comprising:
sending information about the first queue to the second device, wherein the information about the first queue comprises one or more of an identifier of the first queue, a priority of the first queue, or a buffer length of the first queue.

12. The apparatus according to claim 10, wherein the first message further comprises a correspondence, and wherein the correspondence comprises the service parameter identifier of the first packet and the parameter used to forward the first packet.

13. The apparatus according to claim 10, wherein the performing the first operation based on the service parameter identifier comprises:
obtaining a first policy based on the service parameter identifier, wherein the first policy is associated with increasing the priority of the service flow corresponding to the service parameter identifier; and
sending a second packet according to the first policy by using a second queue, wherein the second packet is a packet sent after the first packet in the service flow to which the first packet belongs.

14. The apparatus according to claim 10, wherein the performing the first operation based on the service parameter identifier comprises:
obtaining a first forwarding entry based on the service parameter identifier, wherein the first forwarding entry comprises a correspondence between the parameter used to forward the first packet and a second port, wherein the second port is used to send a second packet, wherein the second packet is sent after the first packet in the service flow to which the first packet belongs, and the second port is different from a first port used to send the first packet; and
sending the second packet based on the first forwarding entry.

15. The apparatus according to claim 14, the operations further comprising:
obtaining a second forwarding entry, wherein the second forwarding entry comprises the parameter used to forward the first packet;
obtaining the service parameter identifier based on the correspondence and the parameter used to forward the first packet, wherein the correspondence comprises the service parameter identifier and the parameter used to forward the first packet; and
obtaining a third packet based on the first packet and the service parameter identifier of the first packet, wherein a packet header of the third packet comprises the service parameter identifier of the first packet.

16. The apparatus according to claim 10, wherein the obtaining the service parameter identifier of the first packet comprises:
obtaining the service parameter identifier from a packet header of a third packet, wherein the packet header of the third packet comprises the service parameter identifier, and wherein the third packet comprises the first packet and the packet header.

17. The apparatus according to claim 10, wherein the parameter used to forward the first packet comprises one or more of an address prefix, a tunnel, or multi-tuple information that match a destination internet protocol (IP) address.

* * * * *